United States Patent [19]
Goldman

[11] Patent Number: 6,092,105
[45] Date of Patent: Jul. 18, 2000

[54] SYSTEM AND METHOD FOR VENDING RETAIL SOFTWARE AND OTHER SETS OF INFORMATION TO END USERS

[75] Inventor: Jonathan P. Goldman, Menlo Park, Calif.

[73] Assignee: Intraware, Inc., Orinda, Calif.

[21] Appl. No.: 08/680,914

[22] Filed: Jul. 12, 1996

[51] Int. Cl.[7] .................................................. G06F 13/00
[52] U.S. Cl. ............................................................ 709/217
[58] Field of Search ........................... 395/200.3, 200.31, 395/200.32, 200.33, 200.36, 200.47, 200.73, 200.74; 709/200, 201, 203, 217, 218, 219

[56] References Cited

U.S. PATENT DOCUMENTS

| | | | |
|---|---|---|---|
| 4,654,799 | 3/1987 | Ogaki et al. | 364/479.04 |
| 4,674,055 | 6/1987 | Ogaki et al. | 364/479.04 |
| 4,787,050 | 11/1988 | Suzuki | 364/479 |
| 4,803,614 | 2/1989 | Banba et al. | 707/10 |
| 4,949,257 | 8/1990 | Orbach | 705/21 |
| 4,953,209 | 8/1990 | Ryder, Sr. et al. | 380/23 |
| 5,166,886 | 11/1992 | Molnar et al. | 709/219 |
| 5,267,171 | 11/1993 | Suzuki et al. | 705/26 |
| 5,291,598 | 3/1994 | Grundy | 395/650 |
| 5,495,610 | 2/1996 | Shing et al. | 709/221 |
| 5,680,453 | 10/1997 | Akiyama et al. | 380/4 |
| 5,809,145 | 9/1998 | Slik et al. | 380/25 |

OTHER PUBLICATIONS

United States Patent and Trademark Office, PCT Written Opinion Sep. 21, 1998.

*Primary Examiner*—Moustafa M. Meky
*Attorney, Agent, or Firm*—Charles E. Gotlieb

[57] ABSTRACT

Method, apparati and computer program products duplicate sets of information such as application software as requested by a user. A number of sets of information are stored locally for duplication or transmission, and additional sets of information are available for remote retrieval for duplication or transmission.

32 Claims, 7 Drawing Sheets

SYSTEM AND METHOD FOR VENDING RETAIL SOFTWARE AND OTHER SETS OF INFORMATION TO END USERS

FIELD OF INVENTION

The present invention relates to information distribution systems, and more specifically to intelligent information distribution systems.

BACKGROUND OF THE INVENTION

Information may be distributed from the manufacturer of the information to an end user of the information using a retailer. For example, computer software, one type of information, may be distributed by the manufacturer of the computer software to an end user of the program via a retailer who displays the software on his shelves in a store. A retailer can provide services such as personal pre-sale assistance and may offer a selection of products based upon knowledge of the local marketplace not possessed by the manufacturer.

Some conventional information distribution schemes attempt to bypass the retailer and allow the distribution of information such as computer software directly from the manufacturer to the end user. Distribution of computer software from manufacturers to end users via the Internet is one example of such a scheme. The justification for these schemes is that stacks of shelving in large stores holding physical media which contain the information is an inefficient use of real estate and capital when information such as computer software may be sent to an end user electronically. Additionally, new versions of computer software containing bug fixes and/or new functionality are made instantly available to end users instead of being made available only after the existing physical inventory is depleted. However, because such schemes can bypass the retailer altogether, they eliminate the services provided by the conventional retailer, and the end user may suffer.

It is possible to include the retailer in the distribution arrangement, while providing much of the efficiency of electronic distribution of information. For example, the retailer may request information to be sent electronically from a manufacturer after consultation with the end user, and the retailer may place the information on a physical medium such as a CD-ROM disc for use by the end user. This allows the retailer to provide an end user a large selection of information without storing all of it in a large retail store, eliminating the carrying costs and much of the real estate costs associated with a conventional retailer. Such a distribution system may allow a retailer to offer a larger selection to end users than would be otherwise economically feasible where information is packaged and stored on a shelf.

Where the amount of information requested by the retailer is large, the time required to receive the information may be unacceptably long due to communication delays. For example, if an end user requests several computer software titles averaging five megabytes each, downloading can take several minutes or more, and the end user may not wish to wait that period of time. An alternative arrangement, whereby each retailer stores all of the available information on a computer storage media such as a hard disk, and then generates the information requested by an end user on a second storage medium such as a CD-ROM may require the retailer to choose between offering a large amount of information at an unacceptably high storage cost, and offering an unacceptably small amount of information compared with the requirements of the end users who visit the store.

SUMMARY OF INVENTION

The present invention stores a subset of information at each retailer, while allowing the retailer electronic access to a much larger amount of information stored at a site shared by many retailers. The subset of information stored at each retailer may be information most likely requested by end users at that retailer, eliminating the communication delays for most end users. The shared site allows each retailer access to a vast amount of information while spreading the costs of storage among many retailers. A mechanism for updating the information as necessary allows a retailer access to the latest version of the information.

A BRIEF DESCRIPTION OF THE DRAWINGS

DETAILED DESCRIPTION OF A PREFERRED EMBODIMENT

Sets of information are any logical or physical grouping of information. Information may be represented electronically, which allows for storage using conventional media such as memories, diskettes, hard disks, CD-ROMs, or tapes. Sets of information may be arranged in files of software, and such an arrangement is described below, although other arrangements of sets of information may also be used.

Figure 1A:
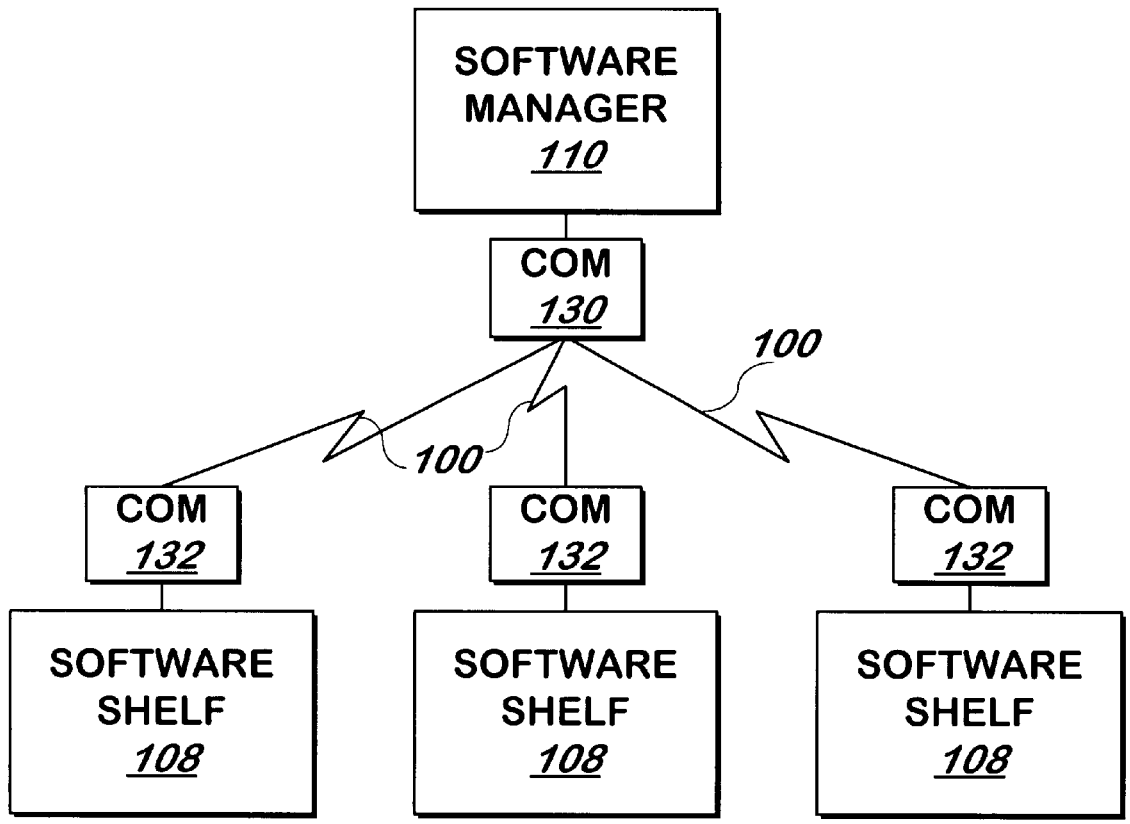
FIG. 1A is a block schematic diagram of a system which stores and provides information according to one embodiment of the present invention.

Referring now to FIG. 1A, one embodiment of a system which stores sets of information according to one embodiment of the present invention is shown. Software manager 110 operates as a type of software file "warehouse", having the capacity to store and distribute a wide variety of software, and one or more software shelves 108 operates as a "retail shelf" holding some of the software files stored in the Software Manager 110. FIG. 1A shows one embodiment of a system containing one software manager 110 and three software shelves 108, but any number of software managers 110 and software shelves 108 may be used in other embodiments.

Software manager 110 communicates via communication driver 130 across communication lines 100 to one or more communication drivers 132 coupled to one or more software shelves 108. Communications drivers 130, 132 may be any form of data communications equipment, such as telecommunications equipment such as conventional modems or local area network interfaces, transmission equipment such as microwave links, or other forms of communications equipment. Communication lines 100 may be any conventional form of communications, such as dial-up telephone lines, leased telephone lines, microwave communications or others.

In one embodiment, software manager 110 is at least ten miles from at least one software shelf 108. In other embodiments, software manager 110 is not more than ten miles from all software shelves 108.

Figure 1B:
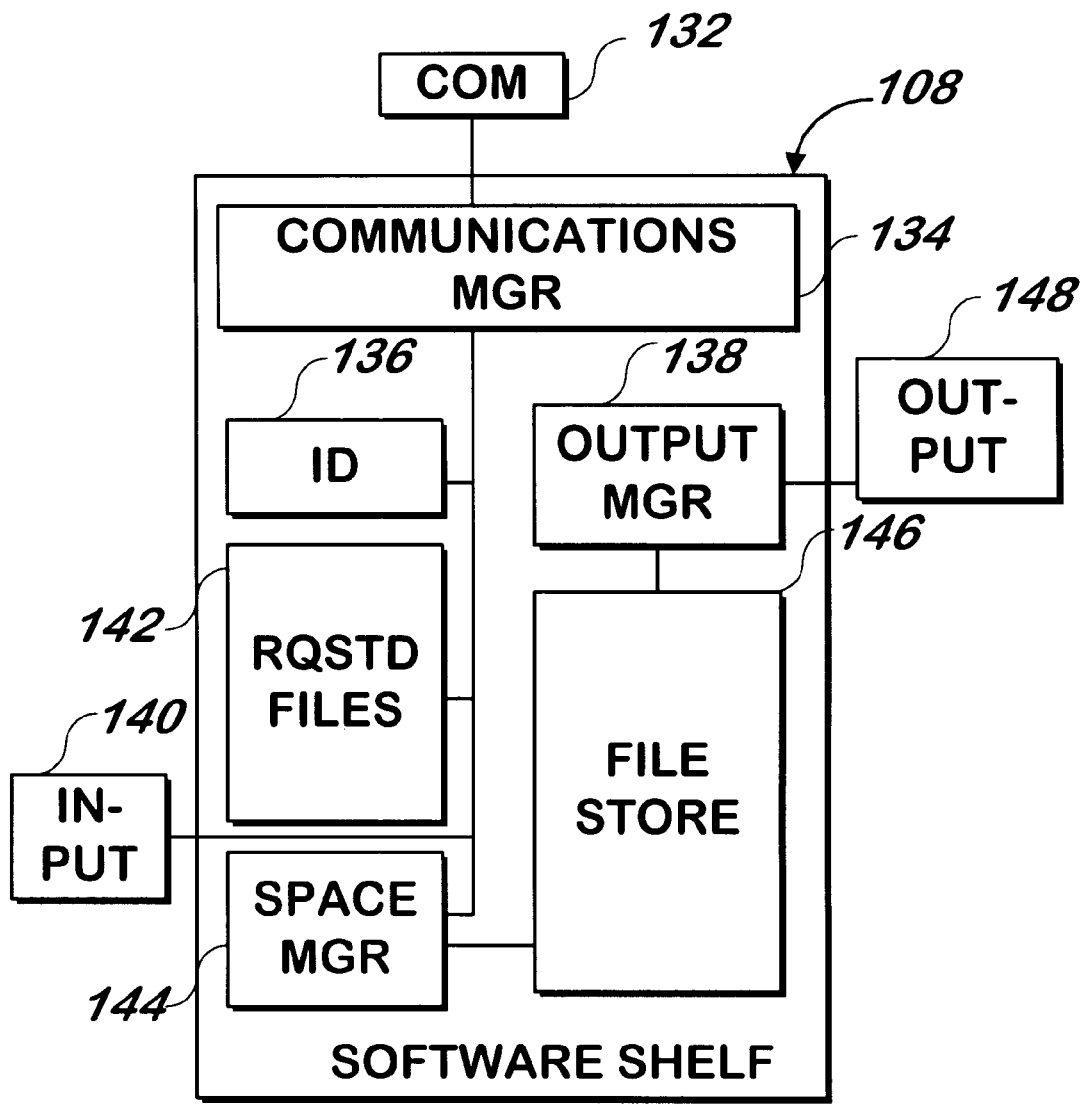
FIG. 1B is a block schematic diagram of a software shelf according to one embodiment of the present invention.

Referring now to FIG. 1B, one embodiment of a software shelf is shown. The software shelf 108 maintains a local set of files in a file store 146 to provide rapid output of these files to an output device 148 upon demand as described below. In one embodiment, the output 148 can record one or more files on a tangible device which is local to the software shelf 108. The local tangible device may be a CD-ROM disc, if output 148 is a CD-R recordable CD-ROM drive or CD-E erasable CD-ROM drive, or a diskette or tape if output 148 is a conventional diskette or tape drive. The local tangible device may be a printed page if output 148 is a printer. In other embodiments, output device may be a communications device such as a modem, a local area network interface or transmission interface which transmits information to another device for immediate use or for recording in a storage medium not local to the software shelf 108. In such embodiments, files may be sent by software shelf directly into an end user's personal computer without the need to physically transfer a media from the software shelf 108 to the personal computer.

In one embodiment, software is requested for output using an input device 140, such as a conventional keyboard and a conventional display monitor, using an indicator such as a catalog number or title, and one or more indicators corresponding to a request may be stored in requested file storage 142. Where there is no requested file storage 142, the indicators are sent as they are entered.

Communications manager 134 formats messages for sending and routes messages received within the software shelf 108.

In one embodiment, the requested file indicators are sent to a space manager 144, which receives from software manager 110 and stores and maintains a list of all files stored in file store 146 as well as indicators such as file name and file size, and information related to the location of each file on file store 146. Space manager 144 compares the indicators requested against a list of the files stored in local file store 146 and if all of the requested files having indicators stored in requested file store 142 are in local file store 146, those files are sent to the output 148 via an output manager 138 that controls the output process, otherwise the files having indicators stored in the requested file storage 142 that are not in the local file storage 146 are requested as described below.

Referring now to FIGS. 1A and 1B, in another embodiment, all file requests are routed by communications manager 132 through the software manager 110 as described below before checking the contents of the file store 146. When all file requests are routed through the software manager 110, the software manager 110 can verify that the most current version of the software requested is available at the software shelf 108, and can record the transaction in a location secure from the user of the software shelf 108 to allow for tamper-resistant billing for the duplication of all of the requested files.

Figure 1C:
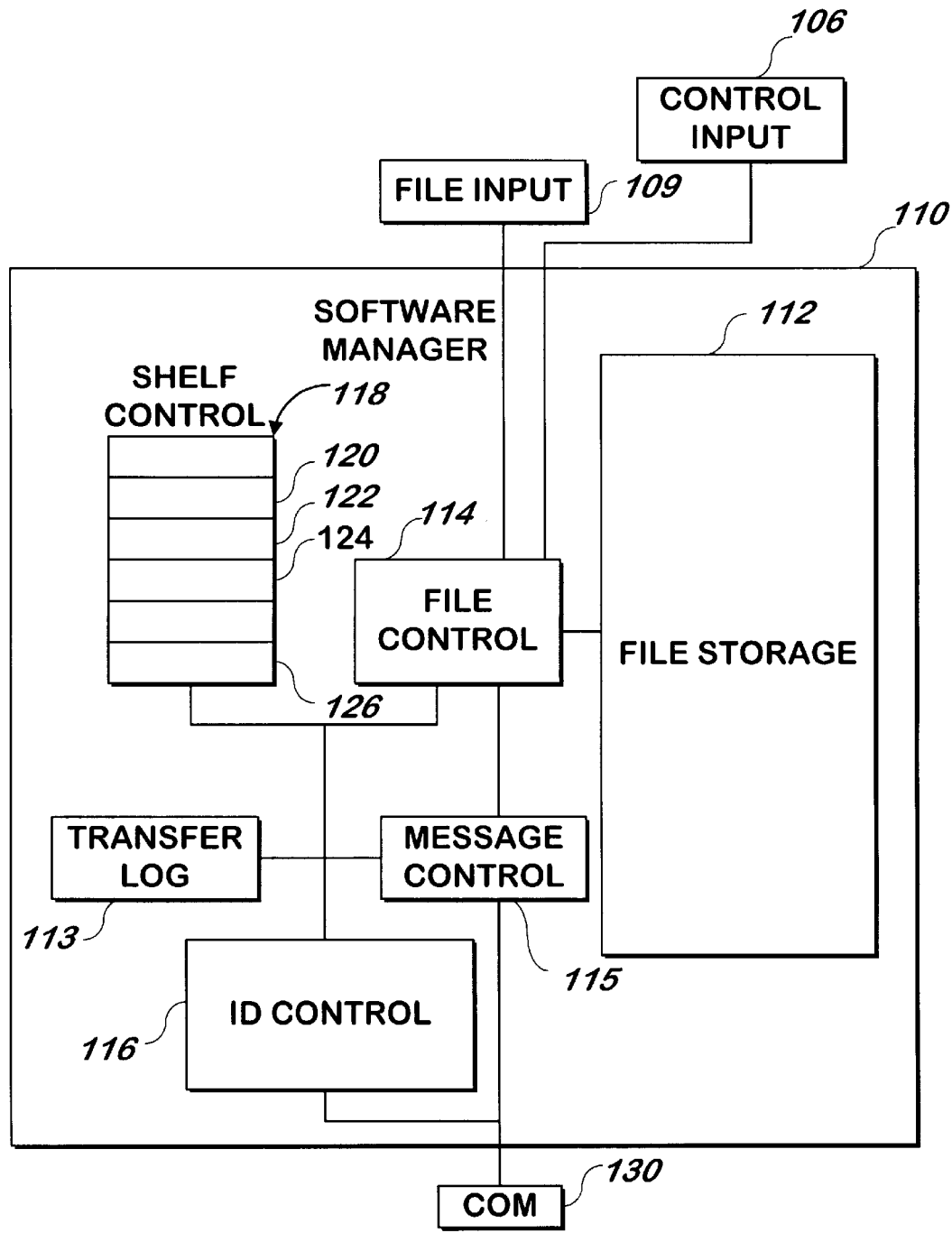
FIG. 1C is a block schematic diagram of a software manager according to one embodiment of the present invention.

Referring now to FIGS. 1A, 1B and 1C, in one embodiment, a software shelf 108 communicates with a software manager 110 using an ID number to allow the software manager 110 to verify the identity of the software shelf 108, and/or the software shelf 108 to verify the identity of the software manager 110. The ID control 116, 136 of the sending device 110, 160 sends an identification number to the ID control 116, 136 of the receiving device 110, 160 which checks the ID number received against a list of valid ID numbers prestored in the ID control 116, 136 of the receiving device. If ID control 116 verifies the ID number, ID control 116 enables message control 115, which receives and interprets the remainder of the communications received, and formats the communications sent.

Referring again to FIGS. 1A and 1B, in one embodiment, the software shelf 108 sends the software manager 110 a list of all requested files stored in requested file store 142 after accepting a set of requested files. The list of files in requested file store 142 may correspond to an order from a customer, or may correspond to files which a retailer believes it should "stock" in the local file store 146 of the software shelf 108. For example, a retailer that intends to offer a special promotional price the next day may wish to stock the software file in anticipation of strong demand. Using input 140, the retailer can identify whether the file should be stored on file store 146 and written using output device 148 after receipt or merely stored on file store 146 in anticipation of strong demand. Some of the files in the requested file store 142 may be indicated using input 140 as files to "hold" as described below.

Referring now to FIGS. 1A, 1B and 1C, in one embodiment, after software shelf 108 sends the list of requested files stored in requested file store 142 to software manager 110, software manager 110 processes the list as described below. FIG. 1C shows one embodiment of the software manager 110 of FIG. 1A. After ID control 116 verifies the identity and authenticity of the software shelf 108 with whom it is communicating as described above, message control 115 assembles the list of requested files received and queries shelf control 118 to determine which files are already stored in the software shelf 108. Each portion 120, 122, 124, 126 of shelf control 118 holds a list of the software files stored in the file store 146 on each software shelf 108 authorized to communicate with the software manager 110. Shelf control 118 maintains these portions 120, 122, 124, 126 to allow software manager 110 to determine which files are already on the software shelf 108 and which files will need to be transferred from the file storage 112 of the software manager 110 to the file store 146 of the software shelf 108 in order to fill the request sent by the software shelf 108. Shelf control 118 also maintains for each software shelf 108 indicators for the usable size of the file store 146 and can identify the files which are least likely to be used in the future.

Figure 2:
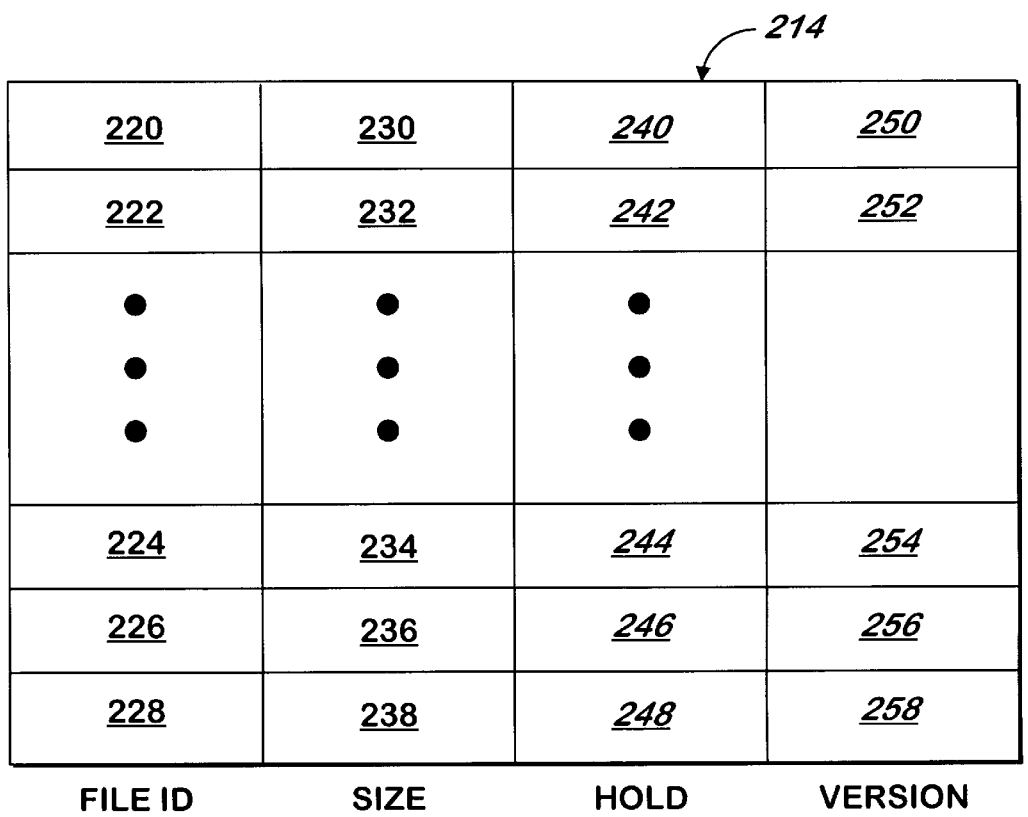
FIG. 2 is a block schematic diagram of a set of database entries according to one embodiment of the present invention.

Referring momentarily to FIGS. 1A and 2, one embodiment of the arrangement of a list of file information in each portion 120, 122, 124, 126 of one embodiment of shelf control 118 is shown. The file identifiers 220, 222, 224, 226, 228 such as a name, identifying code and/or a location code which are stored with the size 230, 232, 234, 236, 238 in bytes corresponding to the file in order of usage. When a file is requested by a software shelf 108 to be written to its output device, the identifiers for that file, such as an identifier 220 such as a file name or a location indicator, and size 230, as well as hold 240, 242, 244, 246, 248 and version 250, 252, 254, 256, 258 indicators described below, are moved to the top of the list 214. "Hold" indicators 240, 242, 244, 246, 248 contains a bit which is set if the file should not be removed from the software shelf, such as if the file was requested in anticipation of large demand as described above, and is not set otherwise. In some embodiments, hold indicators 240, 242, 244, 246, 248 can expire after a period of time and are cleared. In one embodiment, hold bits 240, 242, 244, 246, 248 will expire after a number of days have elapsed since the file was requested, the number of days being indicated at the time the file is requested to be held. In another embodiment, hold bits expire if the file information drops below a certain threshold level on the list 214 as indicated at the time the file is indicated held, allowing files to be held but only if the demand for them is maintained above a certain level on the list 214.

Referring again to FIGS. 1A, 1B and 1C, file control 114 compares the list of requested files received from the software shelf 108 to the list of files shelf control 118 believes are stored on the software shelf and communicates to the message control 115 the list of indicators of the files already on the software shelf 108 and the list of "missing " files. In one embodiment, the indicators of the files already on the software shelf 108 are the locations on the software shelf. Missing files are the files that are not stored in the file store 146 of the software shelf 108 that must be transferred to the software shelf 108 to fill the request.

In addition, file identifiers corresponding to files which are to be deleted from the file store 146 of the shelf 108 to make room for files which must be sent from software manager 110 to software shelf 108 to fill the order are identified. In one embodiment, message control 115 identifies the size of all of the files which must be transferred to fill the order as described above, and communicates this information to the shelf control 118 which maintains the size of the file store 146 for each software shelf 108, and identifies any free space on the file store 146 of the software shelf 108, and if the free space is insufficient to store the missing files, the shelf control 118 identifies the files which should be deleted from the file store 146 of the software shelf 108.

In one embodiment, the size of the file store 146 on the software shelf 108 is not maintained in the shelf control 118, but is instead sent by the software shelf 108 along with the indicators of the requested files. In this embodiment, communications manager 134 queries the space manager 144 which maintains the size of the file store 146 whenever a request is transmitted. This embodiment allows the size of the file store 146 to be adjusted at any time without sending the changed size to the shelf control 118 which may be required where the shelf control 118 stores the size of the file store 146.

In one embodiment, the least recently used files will be identified for deletion, starting with the least recently used file, the second least recently used file and so on until enough files are deleted to free the space for the files which must be transferred to fill the request. In another embodiment, the sizes of the a certain number, such as ten, of the least recently used files are scanned by shelf control 118 to identify the file having the largest size, which is selected for deletion and removed from consideration, and the process is repeated until enough space for the files which must be transferred to fill the request has been identified. In another embodiment, message control 115 sends the size of the missing files to space manager 144, which performs the determination of which files should be deleted to accommodate the missing files as described above, and deletes the files from the file store 146. In another embodiment, message control 115 sends the size of the missing files to space manager 144 upon receipt of the indicators such as the name and file size of the missing files from the file control 114 for such determination. Space manager 144 then sends indicators such as a file identifier to the shelf control 118 to synchronize the files stored in the file store 146 with the list of files in the shelf control 118.

The list of identifiers of files on the file store 146, the list of identifiers of files not on the file store 146 and the list of identifiers of files which are to be deleted from the file store 146 to make room for the files to be sent to the file store 146 are assembled by message control 115 and sent to the software shelf 108 which sent the request via communications drivers 130, 132. Communications manager 134 receives the lists and routes the list of files stored to space manager 144. Space manager 144 maintains its own list of the files stored in file store 146 and confirms that the list of files stored on the file store 146 is accurate and that all of the files to be deleted are located on the file store 146, by sending a confirmation message to the message control 115 in the software manager 110, and the confirmation is relayed by communications manager 134 to message control 115. Space manager 144 then deletes the files which are indicated for deletion. In one embodiment, files are deleted by removing entries related to them in a file allocation table and the list of files stored in the file store 146 maintained in space manager 144 and marking the space in the file store 146 which is occupied by the files as available for reuse. The files which are not located on the file store 146 are retrieved by file control 114 and sent to the file store 146 via space manager 144, which updates its list of files stored on the file store 146. In another embodiment, the files bypass space manager 144 and are sent directly to file store 146 upon receipt by communications manager 134.

Any form of file transfer protocol will operate to transfer the files. In one embodiment, a file transfer protocol is used that can recover from interruptions in the communications between the message control and the communications manager, such as interference in the communications line between the two communications controllers 130, 132 or a power failure at the software manager 110 or software shelf 108. One embodiment, a file transfer protocol breaks up files into blocks sends blocks one at a time using a error correcting code such as a Hamming code, and allows for periodic acknowledgment of receipt of each block by the communications manager 134 in the software shelf 108 to the message control 115 in the software manager 110. Should an acknowledgment not be received, communications resume with the sending of the block following the block for which a valid acknowledgment was received by message control 115.

New versions of the software files may be made available to the software shelf 108 by installing them on the software manager 110. In one embodiment, shortly after new versions of the software are input to the software manager 110 as described below, file control 114 directs shelf control 118 to identify all software shelves 108 which presently store the old version, and message control 115 is directed to initiate contact with each of those software shelves 108, direct each of them to delete the old version, and download the new version as if the new version had been requested described above. Referring momentarily to FIG. 2, in one embodiment, the position of the indicator of the file in the list 214 is preserved by replacing the entry for such file with the new version. In another embodiment the file indicator is inserted at the head 220 of the list 214 as if the new version of the file had been requested as described above. In another embodiment, the new versions are not transferred at once, instead, the transfer is made as the file is requested. In one embodiment, this is accomplished by replacing the file indicators for the old version with indicators for the new version, moving the old version to the bottom of the list and inserting a pointer 250, 252, 254, 256, 258 in the list 214 at the position of the old version, the pointer 250, 252, 254, 256, 258 pointing to the new version. When the file is requested, the pointer 250, 252, 254, 256, 258 is checked, and the new version is sent in its place. The old version will be deleted as space requires because its indicators were moved to the bottom of the list. In another embodiment, the old version is marked for deletion using the version indicator 250, 252, 254, 256, 258 and at the time of any file transfer to the shelf, the old version is identified for deletion.

A new file or new version is inserted using file input 109. The file input 109 may be a conventional CD-ROM drive, a conventional floppy diskette drive, a conventional hard drive, a conventional tape drive, or a modem under control of file control 114. File input 109 accepts a file and transfers it to file storage 112. In one embodiment, file input 109 is coupled to file control 114 which transfers the incoming file to file storage 112. In another embodiment, file input 109 is also coupled directly to file storage 109 allowing for control by file control 114 and direct file transfer to file storage 112.

In one embodiment, a control input 106 is used to provide to file control 114 file information such as file indicators and version number. In one embodiment, control input 106 is a conventional terminal or conventional x86 IBM-compatible personal computer configured to operate as a terminal. Characteristics such as file size may be entered into control input 106 in one embodiment, or calculated by file control 114 in another embodiment. In still another embodiment, control input 106 is not used, and all required information is accepted by file input 109 along with the file. Identifiers such as those described with respect to list 214 of FIG. 2 received from control input 106, file input 109 or calculated as described above are stored in file control 114 along with information related to their location in file storage 112.

In one embodiment, files are sent from software manager 110 to software shelf 108 in encrypted format so that the files cannot be copied without requesting them as described above. The encryption may be any conventional encryption technology. In one embodiment, the files are sent and stored in blocks which are out of order. Output manager 138 unencrypts the files prior to sending them to output 148. For example, where the files are stored on file store 146 in out of sequence blocks, output manager 138 reassembles the blocks in the proper order.

In one embodiment, files which are stored in file store 146 are sent to the output 148 while the missing files are received from the software manager 110. In other embodiments, all requested files are received at the software shelf 108 prior to sending them to the output 148.

In one embodiment, indicators of files which are sent to output 148 are logged into transfer log 113 along with an identifier of the software shelf 108 requesting the file to allow for charging for the file transfer. In one embodiment, the indicator and identifier is written after the file is received by the software shelf 108 to avoid an overcharge which may otherwise occur if the transfer is interrupted and does not complete. In one embodiment, the transfer log 113 is in the software manager 110 as shown in FIG. 1C and which, as described above, receives the list of requested files of requested files 142. The transfer log 113 is coupled to, and under control of, message control 115 in one embodiment, file control 114 in another embodiment, and both message control 115 and file control 114 in another embodiment. In another embodiment(not shown), transfer log 113 resides in software shelf 108 coupled to, and under control of, output manager 138.

In one embodiment, certain commands received from input 140 are interpreted by communications manager 134 as a request for a catalog of available titles of all the files available to software shelf 108, and such a catalog may be displayed on input 140 by communications manager 134 in response to such a command. In one embodiment, communications manager obtains the catalog by requesting from file control 114 a list of indicators corresponding to the files stored in file storage 112. In one embodiment, shelf control 118 maintains a list, input via control input 106 or file input 109, of which files in the file storage 112 are available to an individual shelf 108. In such embodiment, file control 114 verifies the availability to the software shelf 108 of each file in file storage 112 prior to sending an indicator corresponding to that file to the communications manager 132 for display at input 140. Information such as price may also be entered via input 140 or control input 106 and displayed with the other information in the catalog. Where pricing is input via control input 106, it may be stored in shelf control 118 to allow for different pricing for each software shelf 108.

Figure 3:
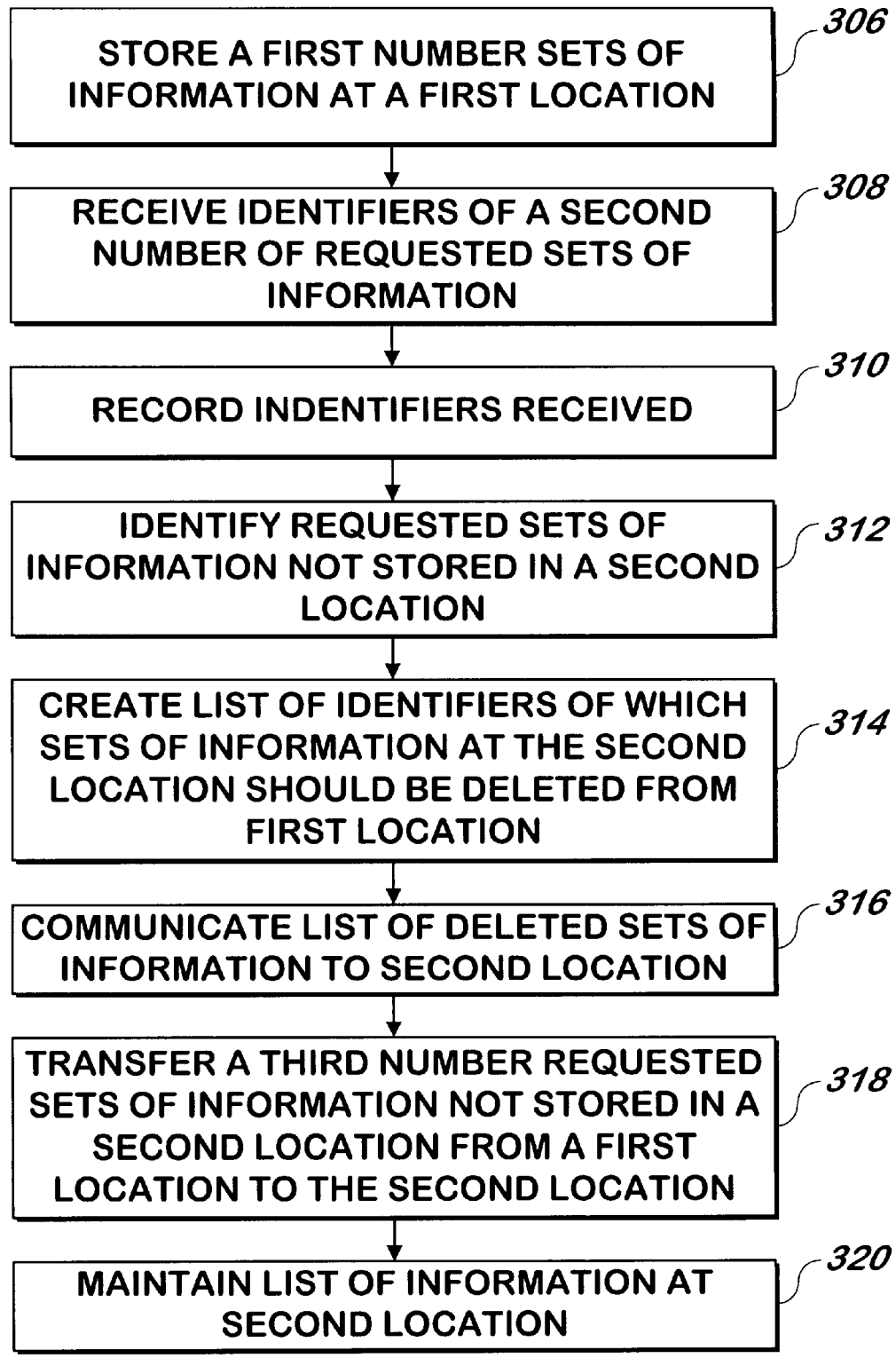
FIG. 3 is a flowchart illustrating a method of providing from a first location such as a software manager sets of information necessary to complete a list of several requested sets of information received according to one embodiment of the present invention.

Referring now to FIG. 3, a method of providing from a first location, such as a software shelf, sets of information necessary to complete a list of several requested sets of information according to one embodiment of the present invention is shown. As described above, a set of information is any logically or physically grouped information, such as a computer file or computer program. A first number of sets of information is stored 306 at a first location. Identifiers of a second number of requested sets of information are received 308 from a second location and examined to identify the requested sets of information not stored at the first location 312. The identifiers received are optionally stored 310, for example to facilitate billing. An optional step of determining 314 which sets of information should be deleted from the second location to make room for the files to be transferred in step 318 may be performed, and the resulting list of identifiers of sets of information may be communicated 316 to the second location. A third number of the requested sets of information which are not stored at the first location are transferred from the first location to the second location 318 to complete the request. In one embodiment, the first number of sets of information stored in the first location will be higher than a number of sets of information stored at the second location. Because the first location stores some of the sets of information stored at the second location, in some embodiments, the third number will be less than the second number. However, the first, second and third numbers may be any number in other embodiments.

An optional step of maintaining 320 at the first location a list of identifiers and other information related to the sets of information stored at the second location is performed by removing from the list the information related to the sets of information communicated for deletion in step 316 and adding to the list information related to the files transferred in step 318. The list may be used to perform the identification step 312 and the creation step 314.

Figure 4:
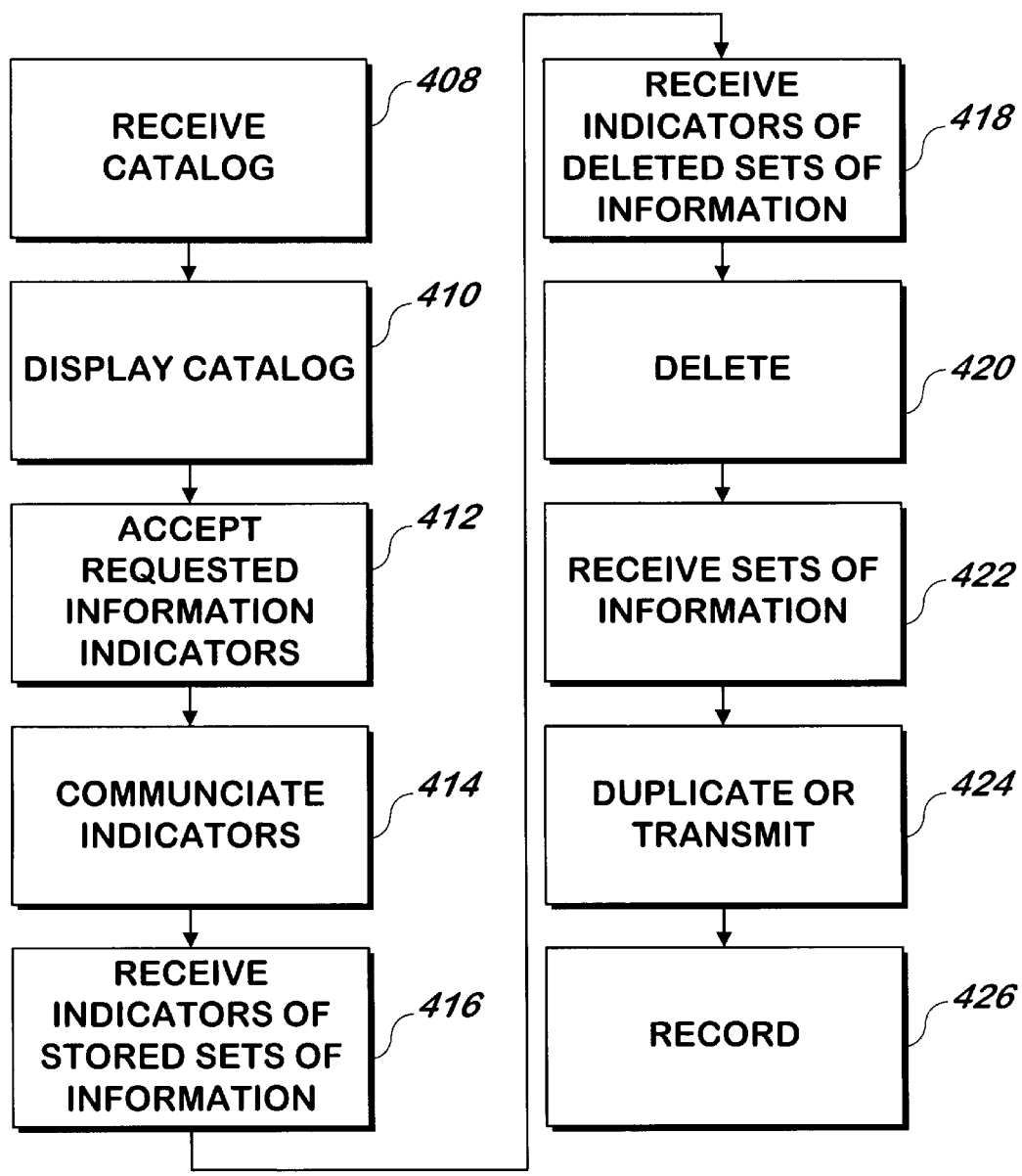
FIG. 4 is a flowchart illustrating a method of providing sets of information at a second location such as a software shelf according to one embodiment of the present invention.

Referring now to FIG. 4, a method of providing sets of information at a second location, such as a software shelf, according to one embodiment of the present invention is shown. A catalog containing indicators corresponding to available sets of information is optionally received 408 from a first location, the catalog is displayed 410, for example to a consumer or retailer, and a list of requested indicators corresponding to the requested sets of information is optionally accepted 412. The requested sets of information may be the sets of information a consumer or retailer is requesting to have on the second location, the location local to the retailer or consumer, and may request to have duplicated as described below. Alternatively, the information may be requested to be transferred to the second location without an immediate request for duplication in anticipation of strong demand. A list of indicators corresponding to the requested sets of information is communicated 414 to a first location such as a software manager, and a set of indicators describing the sets of information already stored at the second location is optionally received 416 as a confirmation that the corresponding sets of information are believed stored at the second location. A set of indicators corresponding to sets of information stored at the second location that should be deleted to make room for the missing sets of information is optionally received 418 and the sets of information corresponding to the set of indicators are deleted 420 from the second location. In one embodiment, deletion occurs via marking the entries in a a file allocation table corresponding to space occupied by the sets of information to be deleted as being available for reuse, but the information itself is not physically removed. The requested but missing sets of information not already at the second location are received 422. Having now received the missing sets of information, the requested sets of information are duplicated, or transmitted for duplication elsewhere 424. In one embodiment, indicators corresponding to the sets of information requested in step 414 are recorded 426 to allow for charging the owner of the software shelf for the information distributed.

The methods of FIGS. 3 and 4 may be used to implement the software manager, software shelf pair described above with reference to FIGS 1B and 1C. It is apparent that, with reference to FIGS. 3 and 4, some of the steps that would be performed at the first location may be performed at the second location, and some of the steps performed at the second location may be performed at the first location to achieve the same or similar functions.

Figure 5:
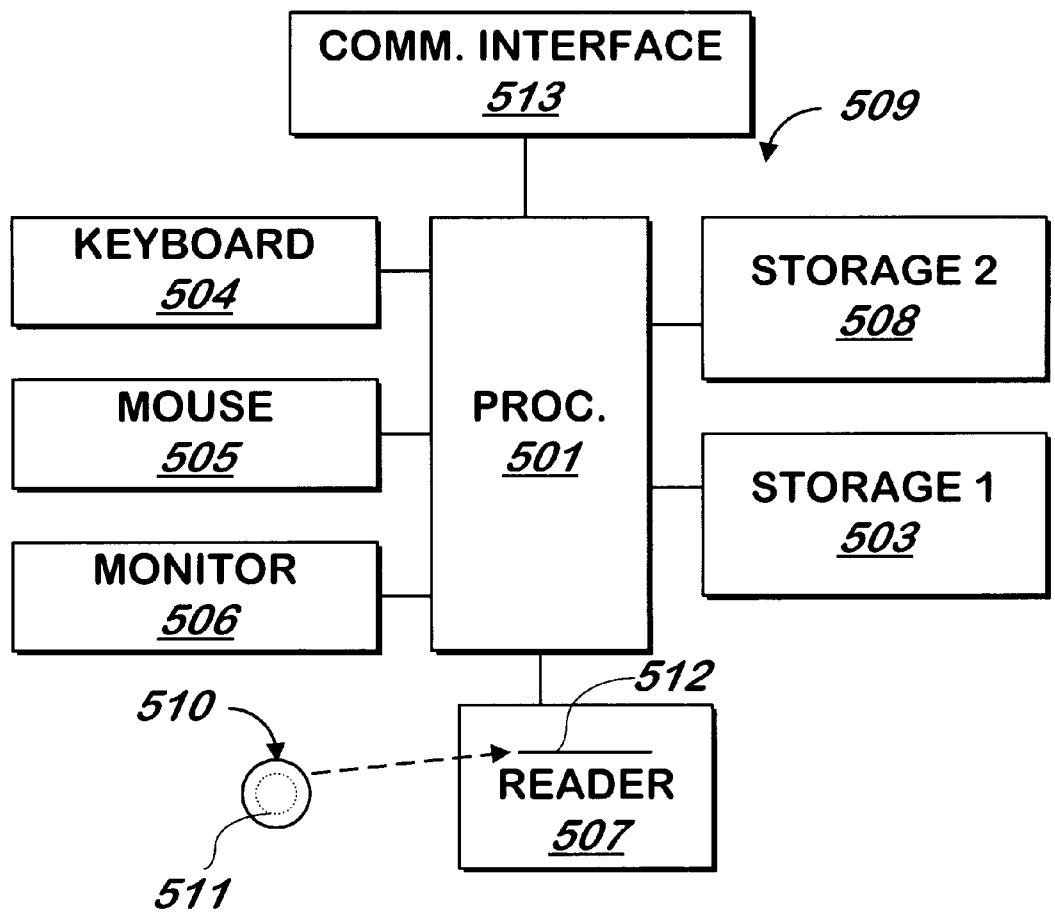
FIG. 5 is a block schematic diagram of a conventional computer system.

Referring now to FIG. 1A, each of the software manager 110 and the software shelf 108 or the methods described above may be implemented in software on a conventional computer system. As shown in FIG. 5, a conventional computer system includes a processor 501 coupled to a first storage device 503 such as a memory, and a second storage device 508 such as a disk storage system. A user may interact with the system via a keyboard 504, mouse 505 and a monitor 506. Computer program product reader 507, such as a memory, hard drive, floppy disk drive or CD-ROM drive can is coupled to processor 501 to allow computer readable program code devices 511 such as encoded bits of a computer program product 511 such as a memory, hard disk, floppy disk, CD-ROM or other storage device to be input to processor 501 and stored in memory 503 and/or disk storage 508 for use in controlling the operation of the computer system 509 when computer program product 510 is inserted into slot 512 of computer program product reader 507. Communication interface 513 such as a modem is also coupled to processor 501 to allow for remote communications, such as those described above. An operating system is loaded into memory 503 or disk storage 508 or a combination of memory 503 and disk storage 508 and instructs processor 501 to load and execute computer program products 510 comprising applications such as those which function as a software shelf or software manager, described above. Many conventional applications are distributed on computer program products 510, such as diskettes, storage devices such as ROMs or disk storage systems, each containing computer readable code devices 511 which cause the computer system 509 to operate in a particular manner such as is described herein when a copy of the code devices is loaded into the computer system 509.

In one embodiment, the methods and apparati described herein are implemented in software and distributed on a computer program product to operate on a conventional computer system such as the computer system 509 shown in FIG. 5. In one embodiment, the software manager is a conventional industry standard 586 or 686 IBM-compatible server with 40 gigabytes of hard disk storage, and the software shelf is a conventional industry standard 586 IBM-compatible personal computer with 10 gigabytes of hard disk storage. The present average size of a software application program is about ten megabytes. As average software sizes change, the storage capacities may adjust to match the new size of software. Storage sizes may also be adjusted to match the number of sets of information such as software application programs that it is desirable to store.

What is claimed is:

1. A method of providing a first group of at least one set of information, the method comprising:

storing at a first location a first plurality of sets of information, at least zero sets of information in the first group in the first plurality, less than all of the sets of information in the first group in the first plurality, each of the sets of information in the first plurality of sets of information having a size;

storing at a second location separate from the first location a second plurality of sets of information, all of the at least one set of information in the first group in at least one selected from the first plurality of sets of information and the second plurality of sets of information;

receiving at the first location a request to provide the first group of at least one set of information;

identifying a second group of at least one set of information in the first group and in the second plurality and not in the first plurality, each said at least one set of information in the second group of at least one set of information having a size;

deleting at least one of the sets of information in the first plurality responsive to the sizes of the sets of information in the second group, the sizes of the sets of information in the first plurality and a storage capacity of the first location;

providing from the second location to the first location the second group of sets of information responsive to the receiving and deleting steps; and providing at the first location for distribution the sets of information in the first group comprising at least one set of information in the first plurality and at least one set of information in the second group.

2. The method of claim 1 additionally comprising the steps of:

storing at the second location a first list of at least one identifier of each of the sets of information in the first plurality;

storing at the second location a second list of at least one identifier of each of the sets of information in a third plurality of sets of information stored at a third location different from the first location, at least one of the third plurality of sets of information not in the first plurality of sets of information; and responsive to the providing from the second location to the first location step:

adding at least one identifier of at least one of the sets of information in the second group to the first list; and maintaining the second list as it existed prior to the providing from the second location to the first location step.

3. The method of claim 1 additionally comprising the step of, responsive to the deleting step:

removing from the first list at least one identifier of at least one of the sets of information deleted; and maintaining the second list as it existed prior to the deleting step.

4. The method of claim 1 comprising the additional step of providing from the first location to the second location the storage capacity of the first location.

5. The method of claim 1 additionally comprising the step of receiving a designation of at least one of the first plurality of sets of information as being in a held group; and wherein the deleting step deletes only sets of information outside the held group.

6. The method of claim 1, comprising the additional steps of:

receiving at the first location a request for a catalog; and providing at the first location a list of identifiers of the second plurality of sets of information responsive to the receiving at the first location the request for the catalog step.

7. The method of claim 6, comprising the additional step of providing a price for each of a third plurality of the second plurality of sets of information.

8. The method of claim 1, wherein the deleting step comprises:

a. identifying from the first plurality of sets of information a third plurality of sets of information provided at the first location less recently than a remainder of the first plurality of sets of information not in the third plurality of sets of information;

b. selecting from the third plurality of sets of information at least one of the sets of information in the third plurality larger than at least one other set of information in the third plurality; and c. deleting the set of information selected.

9. The method of claim 8 comprising the additional step of repeating steps a, b and c responsive to a total of the sizes of the set of information selected less than the size of the sets of information in the second group.

10. The method of claim 1 wherein each of the sets of information in the first group comprise a computer program.

11. The method of claim 1 comprising the additional step of recording at least one identifier of at least one of the sets of information in the first group to facilitate billing.

12. A method of distributing sets of information from a central location to a plurality of remote locations, comprising:

a. storing at the central location a first plurality of the sets of information;

b. storing at a first one of the plurality of remote locations a second plurality of the sets of information;

c. storing at a second one of the plurality of remote locations a third plurality of the sets of information, at least one of the sets of information in the third plurality distinct from the sets of information in the second plurality of the sets of information;

d. receiving from the first one of the plurality of remote locations a request to provide a first group of at least one of the first plurality of sets of information, said request corresponding to a first order for the group of sets of information received at the first remote location;

e. receiving from the second one of the plurality of remote locations a request to provide a second group of at least one of the first plurality of sets of information, said request corresponding to a second order for the group of sets of information received at the second remote location, said second group different from the first group;

f. responsive to step d, providing from the central location to the first one of the plurality of remote locations a first deletion information useful by the first one of the plurality of remote locations to delete at least one of the sets of information in the second plurality stored at said first one of the plurality of remote locations;

g. responsive to step e, providing from the central location to the second one of the plurality of remote locations a second deletion information different from the first deletion information and useful by the second one of the plurality of remote locations to delete at least one of the sets of information in the third plurality stored at said second one of the plurality of remote locations;

h. responsive to step d, providing the first group of sets of information from the central location to the first remote location; and i. responsive to step e, providing the second group of sets of information from the central location to the second remote location.

13. The method of claim 12 comprising the additional steps of:

storing at the central location a first inventory describing the sets of information in the second stored at the first remote location;

storing at the central location a second inventory describing the sets of information in the third plurality and stored at the second remote location;

updating the first inventory responsive to steps f and h; and updating the second inventory responsive to steps g and i.

14. The method of claim 12 wherein each of the sets of information comprises a computer program.

15. The method of claim 12 comprising the additional steps of:

storing at at least one selected from a first place of the central location and the first remote location information useful for charging for at least the first group of the sets of information; and storing at at least one selected from a second place of the central location different from the first place of the central location and the second remote location information useful for charging for at least the second group of the sets of information.

16. A system for providing sets of information at a plurality of retail locations, comprising:

a plurality of software shelves, at least one of the plurality of software shelves at each of the plurality of locations, each of the plurality of software shelves comprising:

an input for receiving a request for a first group of the sets of information;

a first storage for storing a first plurality of the sets of information;

a space manager coupled to the input of the software shelf and the storage of the software shelf for deleting from the first storage at least one of the first plurality of the sets of information responsive to the request, for providing at an input/output a command comprising at least one identifier of at least one of the sets of information in the first group and not in the first plurality and for storing in the first storage of the software shelf at least one set of information received at the input/output of the space manager; and an output coupled to the first storage of the software shelf for providing for distribution the sets of information in the first group; and a software manager in communication with each of the software shelves, comprising:

a second storage for storing a second plurality of the sets of information; and a message control coupled to the input/outputs of the plurality of software shelves and the second storage of the software manager, for receiving the commands from each of the software shelves and providing to each respective one of said software shelves at least one of the sets of information in the second plurality of the sets of information responsive to each said request received from said respective one of the software shelves.

17. The system of claim 16 wherein the software manager additionally comprises a shelf control having an area for each of the plurality of software shelves, each area for storing an inventory of sets of information stored in the first storage area of a respective one of the plurality of software shelves.

18. A computer program product comprising a computer useable medium having computer readable program code embodied therein for providing a first group of at least one set of information, the computer program product comprising:

a first set of computer readable program code devices configured to cause a first computer to store at a first location a first plurality of sets of information, at least zero sets of information in the first group in the first plurality, less than all of the sets of information in the first group in the first plurality, each of the sets of information in the first plurality of sets of information having a size;

a second set of computer readable program code devices configured to cause a second computer to store at a second location separate from the first location a second plurality of sets of information, all of the at least one set of information in the first group in at least one selected from the first plurality of sets of information and the second plurality of sets of information;

a third set of computer readable program code devices configured to cause a third computer to receive at the first location a request to provide the first group of at least one set of information;

a fourth set of computer readable program code devices configured to cause a fourth computer to identify a second group of at least one set of information in the first group and in the second plurality and not in the first plurality, each said at least one set of information in the second group of at least one set of information having a size;

a fifth set of computer readable program code devices configured to cause a fifth computer to delete at least one of the sets of information in the first plurality responsive to the sizes of the sets of information in the second group, the sizes of the sets of information in the first plurality and a storage capacity of the first location;

a sixth set of computer readable program code devices configured to cause a sixth computer to provide from the second location to the first location the second group of sets of information responsive to the third set of computer readable code devices and the fifth set of computer readable code devices; and a seventh set of computer readable program code devices configured to cause a seventh computer to provide at the first location for distribution the sets of information in the first group comprising at least one set of information in the first plurality and at least one set of information in the second group.

19. The computer program product of claim 18 additionally comprising:

an eighth set of computer readable program code devices configured to cause an eighth computer to store at the second location a first list of at least one identifier of each of the sets of information in the first plurality;

a ninth set of computer readable program code devices configured to cause a ninth computer to store at the second location a second list of at least one identifier of each of the sets of information in a third plurality of sets of information stored at a third location different from the first location, at least one of the third plurality of sets of information not in the first plurality of sets of information; and a tenth set of computer readable program code devices configured to, responsive to the sixth set of computer readable program code devices:

cause a tenth computer to add at least one identifier of at least one of the sets of information in the second group to the first list; and cause an eleventh computer to maintain the second list as it existed prior to execution of the sixth set of computer readable program code devices.

20. The computer program product of claim 18 additionally comprising an eighth set of computer readable program code devices configured to, responsive to the fifth set of computer readable program code devices:

cause an eighth computer to remove from the first list at least one identifier of at least one of the sets of information deleted; and cause a ninth computer to maintain the second list as it existed prior to execution of the fifth set of computer readable program code devices.

21. The computer program product of claim 18 additionally comprising an eighth set of computer readable program code devices configured to cause an eighth computer to provide from the first location to the second location the storage capacity of the first location.

22. The computer program product of claim 18 additionally comprising an eighth set of computer readable program code devices configured to cause an eighth computer to receive a designation of at least one of the first plurality of sets of information as being in a held group; and wherein the fifth set of computer readable program code devices deletes only sets of information outside the held group.

23. The computer program product of claim 18, additionally comprising:

an eighth set of computer readable program code devices configured to cause an eighth computer to receive at the first location a request for a catalog; and a ninth set of computer readable program code devices configured to cause a ninth computer to providing at the first location a list of identifiers of the second plurality of sets of information responsive to the eighth set of computer readable program code devices.

24. The computer program product of claim 23, additionally comprising a tenth set of computer readable program code devices configured to cause a tenth computer to provide a price for each of a third plurality of the second plurality of sets of information.

25. The computer program product of claim 18, wherein the fifth set of computer readable program code devices comprise:

a. an eighth set of computer readable program code devices configured to cause an eighth computer to identify from the first plurality of sets of information a third plurality of sets of information provided at the first location less recently than a remainder of the first plurality of sets of information not in the third plurality of sets of information;

b. a ninth set of computer readable program code devices configured to cause a ninth computer to select from the third plurality of sets of information at least one of the sets of information in the third plurality larger than at least one other set of information in the third plurality; and c. a tenth set of computer readable program code devices configured to cause a computer to delete the set of information selected.

26. The computer program product of claim 25 additionally comprising an eleventh set of computer readable program code devices configured to cause the eighth, ninth and tenth computer to repeat operation of computer readable program code devices a, b and c respectively, responsive to a total of the sizes of the set of information selected less than the size of the sets of information in the second group.

27. The computer program product of claim 18 wherein each of the sets of information in the first group comprise a computer program.

28. The computer program product of claim 18 additionally comprising an eighth set of computer readable program code devices configured to cause an eighth computer to record at least one identifier of at least one of the sets of information in the first group to facilitate billing.

29. A computer program product comprising a computer useable medium having computer readable program code embodied therein for distributing sets of information from a central location to a plurality of remote locations, the computer program product comprising:

a. a first set of computer readable program code devices configured to cause a first computer to store at the central location a first plurality of the sets of information;

b. a second set of computer readable program code devices configured to cause a second computer to store at a first one of the plurality of remote locations a second plurality of the sets of information;

c. a third set of computer readable program code devices configured to cause a third computer to store at a second one of the plurality of remote locations a third plurality of the sets of information, at least one of the sets of information in the third plurality distinct from the sets of information in the second plurality of the sets of information;

d. a fourth set of computer readable program code devices configured to cause a fourth computer to receive from the first one of the plurality of remote locations a request to provide a first group of at least one of the first plurality of sets of information, said request corresponding to a first order for the group of sets of information received at the first remote location;

e. a fifth set of computer readable program code devices configured to cause a fifth computer to receive from the second one of the plurality of remote locations a request to provide a second group of at least one of the first plurality of sets of information, said request corresponding to a second order for the group of sets of information received at the second remote location, said second group different from the first group;

f. a sixth set of computer readable program code devices configured to cause a sixth computer to, responsive to computer readable program code devices d, provide from the central location to the first one of the plurality of remote locations a first deletion information useful by the first one of the plurality of remote locations to delete at least one of the sets of information in the second plurality stored at said first one of the plurality of remote locations;

g. a seventh set of computer readable program code devices configured to cause a seventh computer to, responsive to computer readable program code devices e, provide from the central location to the second one of the plurality of remote locations a second deletion information different from the first deletion information and useful by the second one of the plurality of remote locations to delete at least one of the sets of information in the third plurality stored at said second one of the plurality of remote locations;

h. an eighth set of computer readable program code devices configured to cause a eighth computer to, responsive to computer readable program code devices d, provide the first group of sets of information from the central location to the first remote location; and i. a ninth set of computer readable program code devices configured to cause a ninth computer to, responsive to computer readable program code devices e, providing the second group of sets of information from the central location to the second remote location.

30. The computer program product of claim 29 additionally comprising:

a tenth set of computer readable program code devices configured to cause a tenth computer to store at the central location a first inventory describing the sets of information in the second stored at the first remote location;

an eleventh set of computer readable program code devices configured to cause an eleventh computer to store at the central location a second inventory describing the sets of information in the third plurality and stored at the second remote location;

a twelfth set of computer readable program code devices configured to cause a twelfth computer to update the first inventory responsive to computer readable program code devices f and h; and a thirteenth set of computer readable program code devices configured to cause a thirteenth computer to updating the second inventory responsive to computer readable program code devices g and i.

31. The computer program product of claim 29 wherein each of the sets of information comprises a computer program.

32. The computer program product of claim 29 additionally comprising:

a tenth set of computer readable program code devices configured to cause a tenth computer to store at at least one selected from a first place of the central location and the first remote location information useful for charging for at least the first group of the sets of information; and an eleventh set of computer readable program code devices configured to cause an eleventh computer to store at at least one selected from a second place of the central location different from the first place of the central location and the second remote location information useful for charging for at least the second group of the sets of information.

* * * * *